United States Patent [19]

Willinger et al.

[11] 4,301,767
[45] Nov. 24, 1981

[54] HOLDING CLAMP FOR AN AQUARIUM HEATER

[76] Inventors: Allan H. Willinger, 351 E. 84th St., Apt. 21-E, New York, N.Y. 10028; Tsuyoshi Itakura, Itakura Soki Kabushiki Kaisha, 17-20, Unoki 3-chome, Ohta-ku, Tokyo, Japan

[21] Appl. No.: 128,938

[22] Filed: Mar. 10, 1980

[30] Foreign Application Priority Data

Mar. 30, 1979 [JP] Japan .............................. 54-41748[U]

[51] Int. Cl.³ ............................................. A01K 64/00
[52] U.S. Cl. ...................................... 119/5; 248/214; 248/226.1
[58] Field of Search ................. 119/5; 248/214, 226.1, 248/229

[56] References Cited

U.S. PATENT DOCUMENTS

| | | | |
|---|---|---|---|
| 3,358,957 | 12/1967 | Lindenmuth | 248/226.1 X |
| 3,487,935 | 1/1970 | Lovitz | 119/5 X |
| 3,828,176 | 8/1974 | Goldman et al. | 119/5 X |
| 4,021,643 | 5/1977 | Hall et al. | 119/5 X |
| 4,141,524 | 2/1979 | Corvese, Jr. | 248/226.1 X |

FOREIGN PATENT DOCUMENTS 391985 9/1965 Switzerland ........................ 248/214

Primary Examiner—Gene Mancene
Assistant Examiner—Robert P. Swiatek
Attorney, Agent, or Firm—Friedman, Goodman & Teitelbaum

[57] ABSTRACT

A holding clamp for suspending an aquarium heater from the top of an aquarium frame. The clamp includes a bracket having a universal throat which can accommodate different sized frames. The clamp comprises an L-shaped bracket with a retaining member slidably associated with each of the legs of the bracket. Each retaining member defines an adjustable throat size with the opposing leg of the bracket. A locking device is situated on the clamp for securing the clamp to the frame with the retaining members positioned to accommodate the particular frame size. A holder connected to the bracket supports the aquarium heater from the frame and permits the aquarium heater to be suspended into the water.

11 Claims, 7 Drawing Figures

U.S. Patent  Nov. 24, 1981  Sheet 1 of 2  4,301,767

HOLDING CLAMP FOR AN AQUARIUM HEATER

BACKGROUND OF THE INVENTION

This invention relates to holding clamps, and more particularly to a holding clamp for suspending an aquarium heater from the top of an aquarium frame and which permits accommodation of various aquarium frame sizes.

An aquarium heater is generally placed in an aquarium tank in order to maintain the water at a desired temperature. The heater generally is formed of a tube with an outwardly flared lip. Within the tube is contained the heater as well as a thermostat. The electrical circuitry for controlling the heater and thermostat is usually placed in a cap positioned above the tube from which wires extend outside of the aquarium tank to be connected to a source of energy.

The aquarium heater is then generally suspended into the water so that the thermostat elements in the tube can detect the temperature of the water, and when preset temperature limits are reached, the heater will appropriately be turned on or off so as to maintain the desired temperature range of the water. Although the tubular portion of the aquarium heater is situated within the water, the circuitry contained in the cap is generally maintained above the water. Accordingly, it is generally desired to hold the aquarium heater in a rigid manner and suspended from the top portion of the aquarium frame. In order to hold the aquarium heater in this position, a clamp arrangement is necessary to secure the aquarium heater onto the aquarium frame with the tube suspended therefrom and situated in the water with the cap above the water level.

One problem with existing clamp arrangements concerns their ability to accommodate various types of aquarium frames. Generally, the aquarium frame includes a U-shaped channel which receives the upper edge of the glass, with the channel fitting over the glass. However, the width of the aquarium frame varies, depending upon the style and type of frame, as well as depending to some extent upon the thickness of the glass being used. Additionally, most aquarium frames not only include the U-shaped channel, but also include an inwardly extending peripheral lip. The extent that this lip extends inwardly of the frame also varies depending upon the style and type of aquarium frame.

Accordingly, it has become necessary to design the clamp, which holds the aquarium heater, to fit a particular frame style and size. As a result, it has become necessary to have numerous types of clamps each particularly associated with a type of aquarium frame. If one then wants to take an aquarium heater from one aquarium to another, it is not always possible to utilize the same clamp to hold the aquarium heater. A separate type of clamp must be obtained, being particularly designed to accommodate the particular type of aquarium frame being used.

SUMMARY OF THE INVENTION

Accordingly, it is an object of the present invention to provide a holding clamp for suspending an aquarium heater, which can be utilized in conjunction with all types of aquarium frame sizes and styles.

Yet another object of the present invention is to provide a holding clamp for an aquarium heater, which has a universal throat that can be adjusted to accommodate various sized aquarium frames.

A further object of the present invention is to provide a holding clamp for an aquarium heater, which includes an adjustable throat arranged to receive various dimensions of an aquarium frame in two mutually perpendicular directions.

Yet a further object of the present invention is to provide a holding clamp for an aquarium heater, which has a throat that can be adjusted in two mutually perpendicular directions to accommodate different heights and widths of aquarium frames.

Still a further object of the present invention is to provide a holding clamp, which can suspend an aquarium heater from an aquarium frame, and which includes slidable retaining members permitting adjustment of the clamp to accommodate frames of different width sizes and frames of different height sizes.

Still another object of the present invention is to provide a holding clamp for suspending an aquarium heater from the top edge of an aquarium frame, which can be easily assembled, is inexpensive to manufacture, and is simple to utilize and easily adjustable.

Briefly, in accordance with the present invention, there is provided a holding clamp for suspending an aquarium heater from the top of an aquarium frame. The holding clamp includes an L-shaped bracket having first and second legs. A first retaining member is slidably associated along the first leg of the bracket, and with the second leg of the bracket, defines a first throat having an adjustable width, which can accommodate frames of different widths. A second retaining member is slidably engaged along the second leg of the bracket, and with the first leg of the bracket, defines a second throat having an adjustable height for accommodating frames of different heights. A locking member is provided for securing the clamp onto the frame once the retaining members have been positioned to accommodate the particular frame size. A holding device is connected to the bracket for supporting the aquarium heater with the holding clamp secured in place.

In an embodiment of the invention, the first retaining member is an L-shaped member having an elongated slot in one leg, the slot being in registration with an elongated slot on the first leg of the bracket. A threaded stem supported on a block passes from the underside through the registered slots and is engaged by a locking knob on the upper side of the first leg of the bracket. The second retaining member comprises a U-shaped member slidably positioned along a slot contained in the second leg of the bracket. Aligned slots in the arms of the U-shaped member can receive the inwardly extending peripheral lip around the aquarium frame.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DETAILED DESCRIPTION OF THE PREFERRED EMBODIMENT

Figure 1:
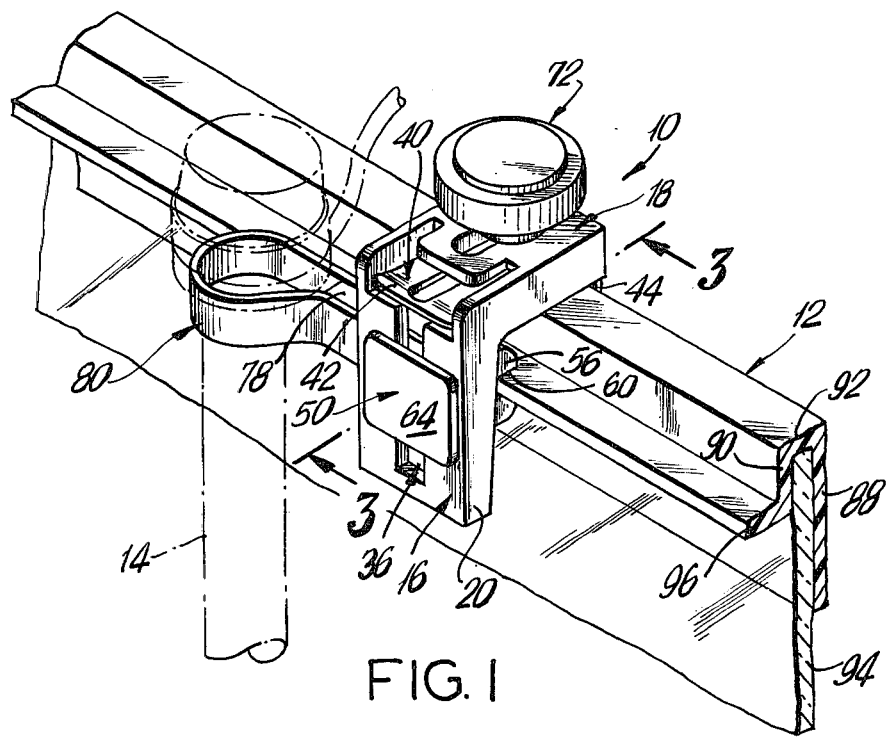
FIG. 1 is a perspective view of the clamp positioned on the upper edge of an aquarium frame and supporting an aquarium heater.
Figure 2:
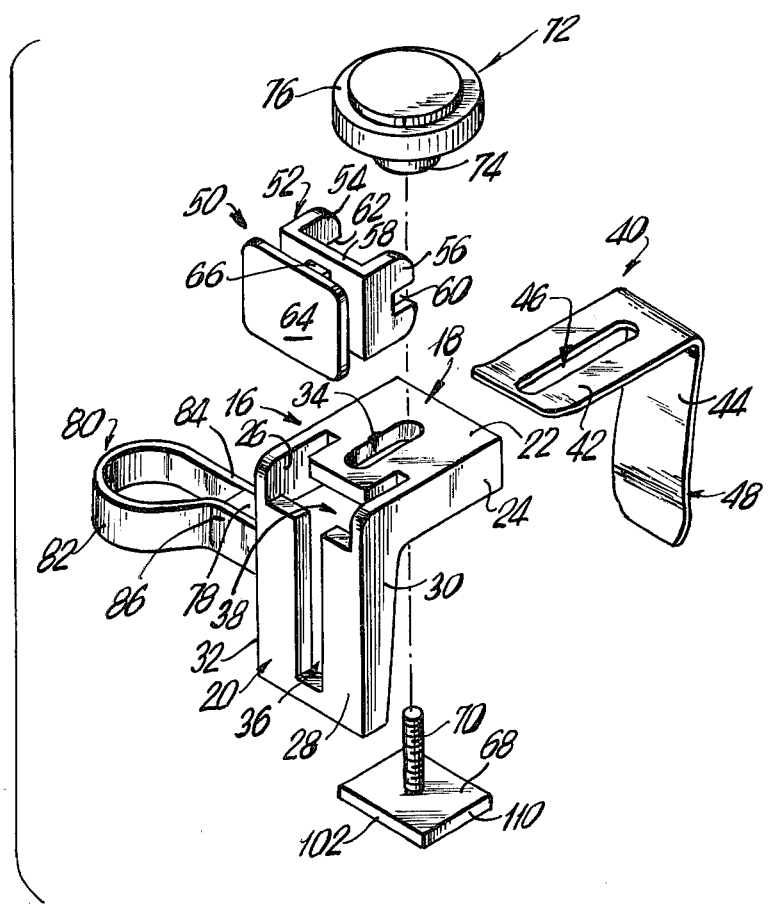
FIG. 2 is an exploded perspective view of the parts of the holding clamp.

Referring now to FIGS. 1 and 2, the holding clamp of the present invention is shown generally at 10, is situated on the upper edge of an aquarium frame, shown generally at 12, and supports an aquarium heater, shown at 14 in phantom lines. The holding clamp comprises an L-shaped bracket 16 having first and second legs 18, 20 at right angles to each other. Each of the legs 18, 20 is U-shaped in cross section. The first leg 18 includes a top wall 22, with depending side walls 24, 26. The second leg 20 includes a rear wall 28, with inwardly directed side walls 30 and 32. The side walls 30 and 32 are slightly tapered toward the bottom.

An elongated slot 34 is centrally located in the upper wall 22 of the first leg 18. A T-shaped slot 36 is formed in the rear wall 28 of the second leg 20. Also formed in the upper wall 22 is a U-shaped slot 38. The bight portion of the U-shaped slot and the top portion of the T-shaped slot are coincidental with the junction of the first and second legs of the bracket 16, whereby the corner of the bracket is substantially removed.

A first retaining member 40 is provided in slidable relationship with the first leg 18. The first retaining member 40 is formed as an L-shaped spring clip having a first leg 42 orthogonally positioned with respect to a second leg 44. The first leg 42 includes an elongated slot 46 which is positioned to be in registration with the slot 34 of the first leg 18 of the bracket 16. The second leg 44 is inwardly bowed at 48.

A second retaining member 50 is slidably positioned with respect to the second leg 20 of the L-shaped bracket 16. The second retaining member 50 includes a U-shaped member 52 having inwardly extending arms 54, 56 with an interconnecting web portion 58. Aligned slots 60, 62 are registered with one another and are colinearly positioned in the arms 54, 56. A flat head 64 is spaced from the connecting web 58 and is interconnected thereto by means of a neck portion 66. The spacing between the flat head 64 and the connecting web 58 is slightly greater than the wall thickness of the rear wall 28 of the second leg 20 of the bracket 16. The neck portion 66 is of a width capable of sliding within the slot 36 of the second leg 20. The U-shaped member 52 is of a size that can fit within the U-shaped slot 38 formed in the first leg 18 of the bracket 16, so that the neck portion 66 of the second retaining member 50 can be inserted into the slot 36.

A locking means is provided and includes the block 68 of substantially rectangular configuration supporting an upwardly extending threaded stem 70 of a size that can pass through the elongated registered slots 34, 46 and extend upwardly therefrom. A locking knob, shown generally at 72, includes a threaded bore in its shank portion 74 which receives and tightens onto the threaded stem 70. A widened head portion 76 facilitates rotating of the locking knob.

Laterally extending from the side 32 of the bracket 16 is an arm 78 supporting a slooped retaining strap 80 including the loop portion 82 and the side leg portions 84, 86. The retaining strap 80 receives and supports the aquarium heater 14.

The conventional aquarium frame can best be seen in FIG. 1, and includes a first elongated leg 88 and a second shortened leg 90 with an upper bight portion 92 therebetween, to form a channel for receiving the glass 94. An inwardly extending lip 96 is peripherally formed about the aquarium frame 12 and extends inwardly from the shortened leg 90.

The particular size of the aquarium frame can vary depending upon the style, the design, and size of the aquarium tank. However, in almost all cases it will include a channel portion for receiving the glass, with an inwardly extending lip, as was described in connection with FIG. 1. However, the vertical distance between the top wall 92 and the inwardly extending lip 96 can vary depending upon the particular aquarium frame. Similarly, the horizontal width of the channel portion, as well as the extent to which the lip inwardly extends, can also vary depending upon the frame style.

The present holding clamp is of a type that provides a universal throat permitting accommodation of the various sized aquarium frames. More specifically, it will permit adjustment of a variable width throat and a variable height throat to accommodate the frame size.

The various parts shown in FIG. 2 are assembled as hereinafter set forth. The second retaining member 50 is inserted through the U-shaped slot 38 with the arms 54, 56 extending away from the wall 28 so that the neck portion 66 slides into the slot 36 and the flat head 64 slides on the outer surface of the wall 28. The second retaining member 50 can then slide in a vertical direction within the slot 36. The U-shaped member 52 sits within the U-shaped channel of the second leg 20 of the bracket 16, and is nested within that U-shaped configuration. Thus, the width of the connecting web 58 proximates the spacing between the walls 30, 32 forming the U-shaped portion of the second leg 20 of the bracket 16.

The first retaining member 40 is then assembled by inserting the leg 42 between the walls 24, 26 of the first leg 18 of the bracket. The width of the leg 42 of the first retaining member 40 is of a width proximating the distance between the two side walls 24, 26, so that it sits within the U-shaped configuration of the first leg 18 of the bracket 16. The slots 46 and 34 will be in aligned position, and the leg 42 closes or blocks the U-shaped slot 38 to retain the retaining member 50 in the slot 36.

The threaded stem 70 is inserted upwardly through the registered slots 46, 34 and the locking knob 72 is threaded onto the stem. However, the locking knob is not tightened down onto the bracket. This permits the first retaining member 40 to slide with respect to the leg 18 of the bracket 16 and move inwardly and outwardly with respect to the bracket. When the retaining member 40 is properly positioned over the frame edge, the locking knob 72 is tightened onto the bracket to retain the bracket in proper position.

Figure 3:
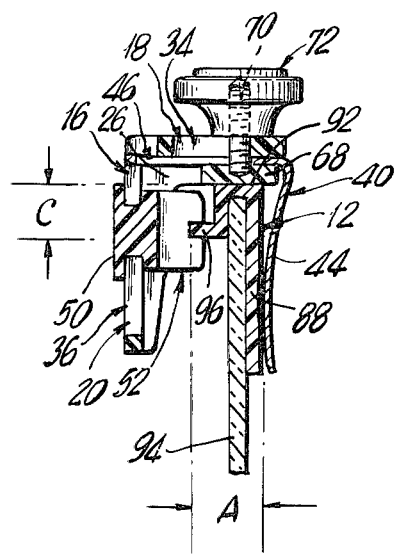
FIG. 3 is a side sectional view taken along line 3—3 of FIG. 1, and showing the clamp in position on an aquarium frame of a first size.
Figure 4:
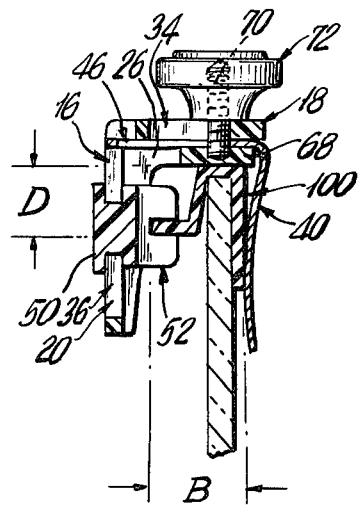
FIG. 4 is a view similar to that of FIG. 3 and showing an aquarium frame of a second size.

Referring now to FIGS. 3 and 4, there will be described how the present holding clamp can accommodate various sizes of aquarium frames. As can best be seen in FIGS. 1 and 3, the holding clamp is placed over the top portion of the aquarium frame so that the bottom of the block 68 sits on the top wall 92 of the frame. The U-shaped member 52 is then vertically slid along the elongated slot 36 so that the aligned slots 60, 62 in its arms 54, 56 can receive the inwardly extending lip 96 of the frame. The second retaining member, specifically the spring clip 40, is then inwardly slid along the first leg 18 of the bracket 16 until the leg 44 abuts against the outer side of the frame wall 88. The locking knob 72 is then tightened to hold the clamp in proper position on the aquarium frame.

As noted in FIG. 3, the width of the aquarium frame, from the outer edge of its outer wall 88 to the termination of the inner lip 96, is designated by the width dimension A. The critical height of the frame is measured from the lower surface of the lip 96 to the upper edge of the frame 92 and is designated by the letter C. The holding clamp is arranged to accommodate for these sizes. Specifically, the second retaining member 50 which can vertically slide along the second leg 20 provides a throat portion to accommodate the appropriate height of the frame and accordingly provides an adjustable throat in the vertical direction to accommodate the variable vertical dimensions of the frame. The first retaining member 40 sliding along the first leg 18 provides a throat in the width dimension and can be adjusted to provide a variable width throat to accommodate the variable width dimensions of the aquarium frame.

As noted in FIG. 4, the width dimension of a different aquarium frame 100 has a substantially wider horizontal size designated by the letter B. Similarly, the height of the aquarium frame 100 has substantially a greater height, as shown by the letter D. The clamp 10 of the present invention can accommodate these sizes by adjusting the second retaining member 50 to accommodate the vertical height for providing an appropriate vertical throat, and by further adjusting the first retaining member 40 to slide along the leg 18 to provide an appropriate width throat.

In the embodiment heretofore described, the first retaining member 40 was a spring clip. Accordingly, the block 68 supporting the stem 70 had a length dimension along the side 102 equal to a distance between the side walls 24, 26 of the bracket 16 so that it can snugly fit within the U-shaped configuration of the bracket. This is best seen in FIGS. 3 and 4 where the block 68 has its lower surface flush with the end of the side walls 24, 26.

Figure 5:
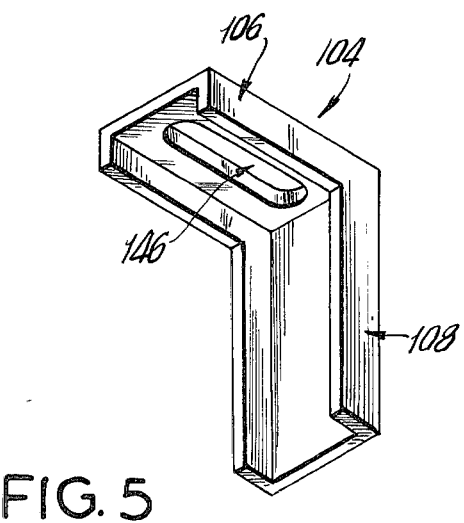
FIG. 5 is a perspective view of a retaining member, in accordance with another embodiment of the present invention.
Figure 6:
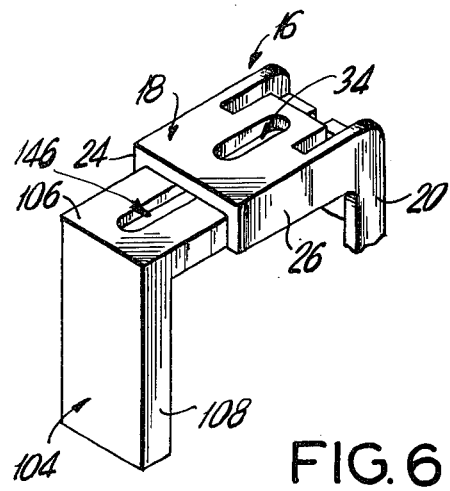
FIG. 6 shows the assembly of the retaining member shown in FIG. 5 with the bracket, to form a portion of the holding clamp.

Referring now to FIG. 5, the first retaining member is shown in a slightly different configuration. Instead of a leaf spring, the bracket member 104 is utilized having a first leg 106, and a perpendicular second leg 108, both of U-shaped cross section. The width dimension is such that it will snugly fit between the walls 24, 26 of the leg 18 of the bracket 16, as best seen in FIG. 6. Again, an elongated slot 146 is formed in the bracket member leg 106 so as to be in registration with the slot 34 in the bracket 16.

Figure 7:
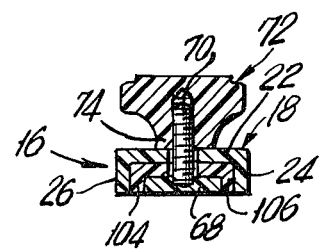
FIG. 7 is a side sectional view taken through an upper part of the holding clamp using the embodiment of the retaining member shown in FIG. 5.

As can best be seen in FIG. 7, the same block 68 can be utilized with the configuration of FIG. 5 by making the width dimension of the side 110 of a size to fit between the walls of the leg 106 of the modified first retaining member 104. Thus, the same block 68 can be utilized for the spring leaf configuration 40 shown in FIGS. 1-4, as well as for the bracket member configuration 104 shown in FIGS. 5-7. When using the leaf spring 40, the wider dimensioned side 102 of the block 68 will be utilized for positioning between the legs 24, 26 of the bracket 16 itself. When using the embodiment shown in FIGS. 5-7, the smaller dimensioned side 110 of the block 68 will be utilized to fit within the side walls of the first retaining member 104.

The bracket 16 itself, as well as the other portions, can be made of plastic molded material, or of metal. Similarly, the various retaining members can also be formed of plastic or metal. Of course, the leaf spring is best made out of a metal material. However, the embodiments shown in FIGS. 5-7 utilizing a bracket member 104 in place of the leaf spring 40 could utilize a plastic or metal part.

Although the holding means for the aquarium heater 14 is shown as extending laterally from a side of the bracket 16, it is understood that such position of the holding means is for convenience to accommodate and facilitate sliding of the second retaining member 50. However, other configurations could be utilized, such as a bridge structure, a U-shaped bracket, etc. whereby the holding means could extend outwardly from the rear wall of the bracket 16. Additionally, other positions could be utilized as is appropriate.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A holding clamp for suspending an aquarium heater from the top of an aquarium frame, said holding clamp comprising:
   an L-shaped bracket having first and second perpendicular legs;
   a first retaining member slidable along said first leg of said bracket, said first retaining member and the second leg of said bracket providing a horizontal throat having an adjustable width for accommodating frames of different width sizes;
   a second retaining member slidable along the second leg of said bracket, said second retaining member and the first leg of said bracket providing a vertical throat having an adjustable height for accommodating frames of different height sizes;
   locking means for securing the holding clamp to the aquarium frame with said retaining members being positioned to accommodate the appropriate frame size;
   holding means connected to said bracket for supporting the aquarium heater;
   said first retaining member including an L-shaped member having an elongated slot in a first leg thereof, an elongated slot being provided in said first leg of said L-shaped bracket, said locking means comprising a stem portion extending through both elongated slots to permit sliding of said L-shaped member with respect to said L-shaped bracket, and a locking knob engaging said extended stem for securely clamping together said first legs of both said L-shaped member and said L-shaped bracket, whereby the second legs of both said L-shaped member and said L-shaped bracket are spaced apart a desired distance from each other to define the desired horizontal throat;
   said first and second legs of said L-shaped bracket being U-shaped in cross section, and said locking means including a block fitting within the U- shaped configuration of said first leg of said bracket, said block supporting a threaded stem extending through the elongated slots, and said locking knob having a threaded bore therein for receiving said threaded stem and tightening down against an outer side of said first leg of said bracket; and said first retaining member being an L-shaped spring clip, said first leg of said spring clip slidably nesting within the first leg of said bracket, and said second leg of said spring clip being inwardly bowed, said block having at least one width dimension fully extending across the distance between the spaced apart walls of the U-shaped configuration of the first leg of the bracket.

2. A holding clamp for suspending an aquarium heater from the top of an aquarium frame, the aquarium frame including an inwardly directed peripheral lip, the lip being spaced from the top of the frame a different distance for different frames, said holding clamp comprising:

an L-shaped bracket having first and second perpendicular legs;

a first retaining member slidable along said first leg of said bracket, said first retaining member and the second leg of said bracket providing a horizontal throat having an adjustable width for accommodating frames of different width sizes;

a second retaining member slidable along the second leg of said bracket, said second retaining member and the first leg of said bracket providing a vertical throat having an adjustable height for accommodating frames of different height sizes;

said second retaining member including a holding member slidable along an inner surface of said second leg of said bracket, said holding member including slot means for receiving and holding therein the peripheral lip of the frame, said second retaining member including coupling means for mounting said holding member to slide along said second leg of said bracket;

locking means for securing the holding clamp to the aquarium frame with said retaining members being positioned to accommodate the appropriate frame size; and holding means connected to said bracket for supporting the aquarium heater.

3. A holding clamp as in claim 2, wherein said holding member of said second retaining member has spaced apart arms and a connecting web therebetween to define a U-shaped member, said slot means including co-linearly aligned open ended slots in each of said arms.

4. A holding clamp as in claim 3, wherein said second retaining member coupling means includes a flat head portion interconnected to the connecting web of said U-shaped member by a neck portion, the distance between said flat head portion and said interconnecting web being slightly greater than the thickness of said second leg of said bracket, said second leg of said bracket including an elongated slot for slidably receiving said neck portion, said flat head portion being positioned on an outer side of said second leg of said bracket and said U-shaped member being positioned on an inner side thereof.

5. A holding clamp as in claim 4, wherein said first and second legs of said bracket are U-shaped in cross section, and wherein said U-shaped member slidably nests within the second leg of said bracket.

6. A holding clamp as in claim 4, wherein said elongated slot in said second leg of said bracket is of T-shape and said first leg further comprises a U-shaped slot of a size capable of receiving therethrough said U-shaped member, a bottom section of the U-shaped slot and a top section of the T-shaped slot being coincidental with the juncture of the first and second legs of the bracket, whereby said second retaining member can be inserted and removed from said bracket.

7. A holding clamp as in claim 2, wherein said holding means comprises an arm laterally extending from one side of said bracket, and a looped retaining strap supported by said arm for receiving therein the aquarium heater.

8. A holding clamp as in claim 2, wherein said first retaining member comprises an L-shaped member having an elongated slot in a first leg thereof, an elongated slot being provided in said first leg of said L-shaped bracket, said locking means comprising a stem portion extending through both elongated slots to permit sliding of said L-shaped member with respect to said L-shaped bracket, and a locking knob engaging said extended stem for securely clamping together said first legs of both said L-shaped member and said L-shaped bracket, whereby the second legs of both said L-shaped member and said L-shaped bracket are spaced apart a desired distance from each other to define the desired horizontal throat.

9. A holding clamp as in claim 8, wherein said L-shaped member and said L-shaped bracket include positioning means to slide in opposition to each other.

10. A holding clamp as in claim 8, wherein said first and second legs of said L-shaped bracket are U-shaped in cross section, and said locking means includes a block fitting within the U-shaped configuration of said first leg of said bracket, said block supporting a threaded stem extending through the elongated slots, and said locking knob having a threaded bore therein for receiving said threaded stem and tightening down against an outer side of said first leg of said bracket.

11. A holding clamp as in claim 10, wherein said first retaining member is a rigid L-shaped member having first and second legs each being U-shaped in cross section, the first leg of said L-shaped member slidably nesting with the first leg of said L-shaped bracket, and said block having at least one width dimension extending across the distance between the spaced apart walls of the U-shaped configuration of said L-shaped member.

* * * * *